United States Patent
Uhlig

[11] Patent Number: 5,909,785
[45] Date of Patent: Jun. 8, 1999

[54] TWIN RAMP BRAKE PAD REACTION MEMBER

[75] Inventor: Robert P. Uhlig, Rochester Hills, Mich.

[73] Assignee: Chrysler Corporation, Auburn Hills, Mich.

[21] Appl. No.: 08/988,062

[22] Filed: Dec. 10, 1997

[51] Int. Cl.[6] .............................. F16D 65/14; F16D 65/38
[52] U.S. Cl. ................................ 188/250 G; 188/73.37; 188/206 R
[58] Field of Search .................. 188/73.1, 73.31, 188/73–34, 73.37–73.43, 250 B, 250 D, 250 F, 250 G, 205 A, 205 R, 206 A, 206 R

[56] References Cited

U.S. PATENT DOCUMENTS

| | | | |
|---|---|---|---|
| 3,343,770 | 9/1967 | Szonn | 188/250 G |
| 3,920,104 | 11/1975 | Hoffmann | 188/250 B |
| 3,972,393 | 8/1976 | Courbet et al. | 188/73.1 |
| 4,146,118 | 3/1979 | Zaukl | 188/73.1 |
| 4,200,173 | 4/1980 | Evans et al. | 188/250 B |
| 4,560,038 | 12/1985 | Gevard et al. | 188/73.1 |
| 4,823,921 | 4/1989 | Bosco | 188/250 B |
| 4,858,732 | 8/1989 | Taylor, Jr. | 188/250 G |
| 4,865,163 | 9/1989 | Kondo | 188/73.1 |
| 5,129,487 | 7/1992 | Kobayashi et al. | 188/250 B |
| 5,551,537 | 9/1996 | Mery et al. | 188/73.1 |

*Primary Examiner*—Chris Schwartz
*Attorney, Agent, or Firm*—Lawrence J. Shurupoff

[57] ABSTRACT

A mounting assembly for a disc brake pad which has a first end portion provided with a finger engaged with a reaction surface in a slot of a reaction block to partially restrain the disc brake pad when it is applied against a rotor. The reaction surface is machined at an angle or in an arc to counterbalance the couple which forces the leading end of the disc brake pad inwardly against the rotor. The disc brake pad has a substantially unrestrained second end portion which is cantilevered from the first end portion. Braking forces are reacted virtually exclusively against the reaction block which is located externally of and separated from the disc brake caliper assembly.

14 Claims, 3 Drawing Sheets

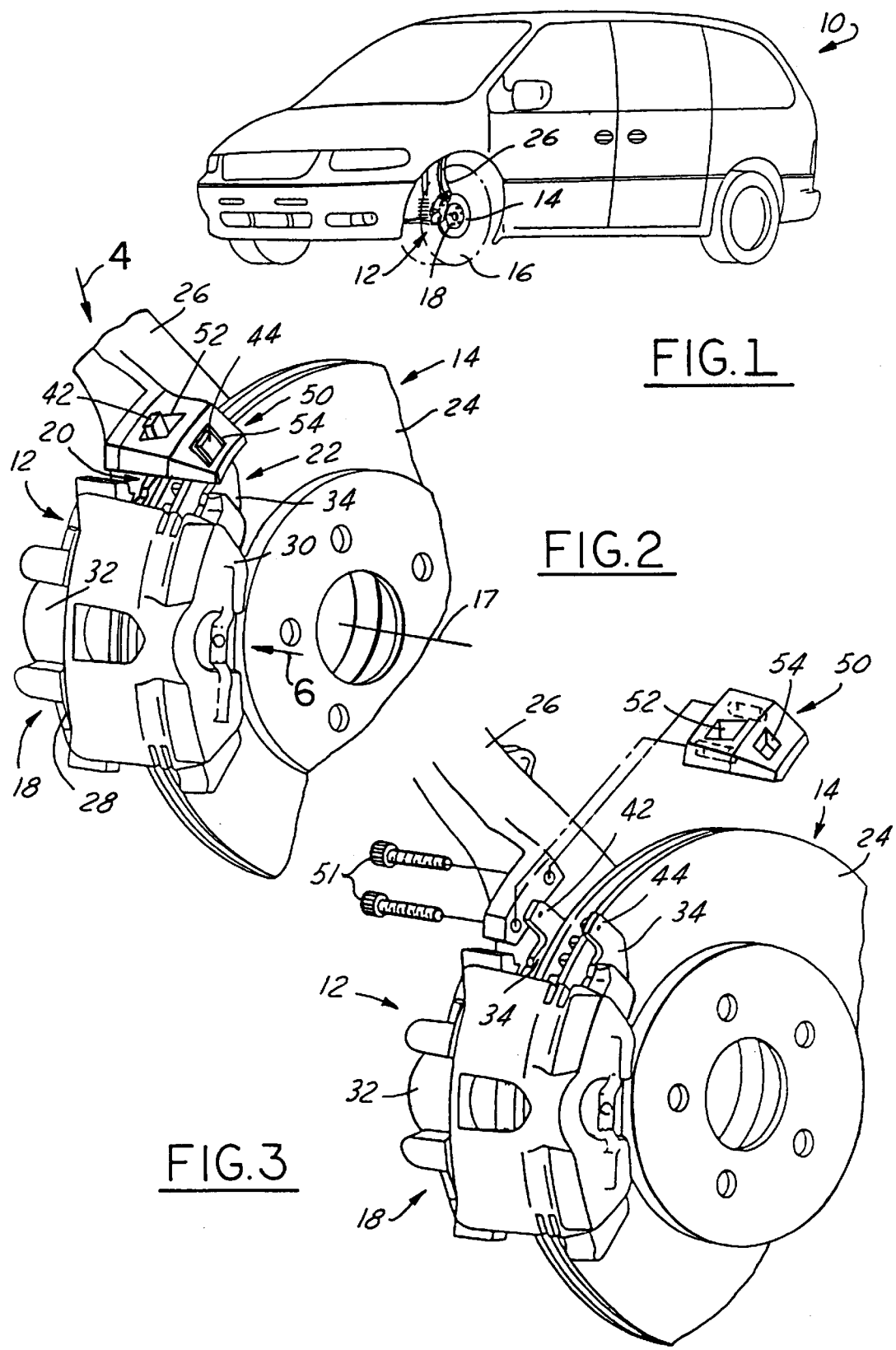

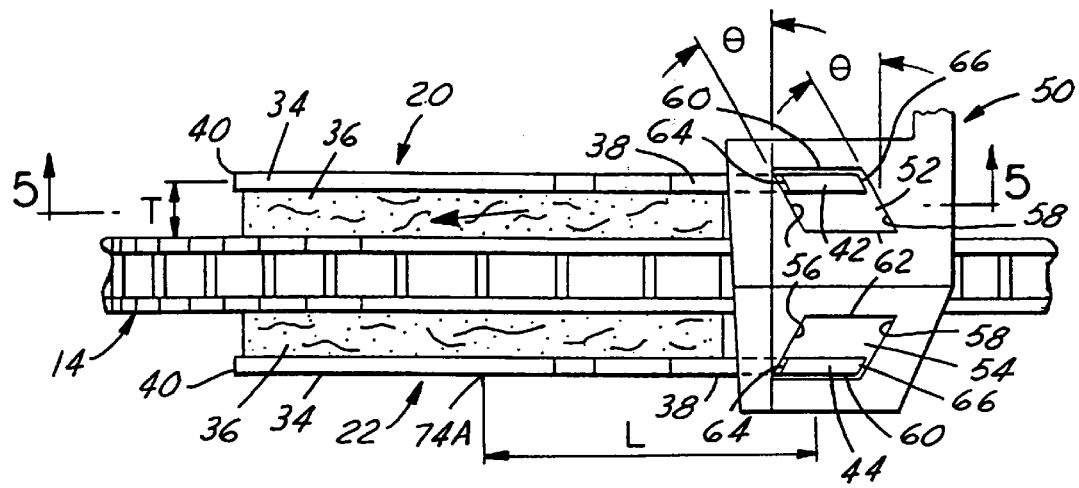
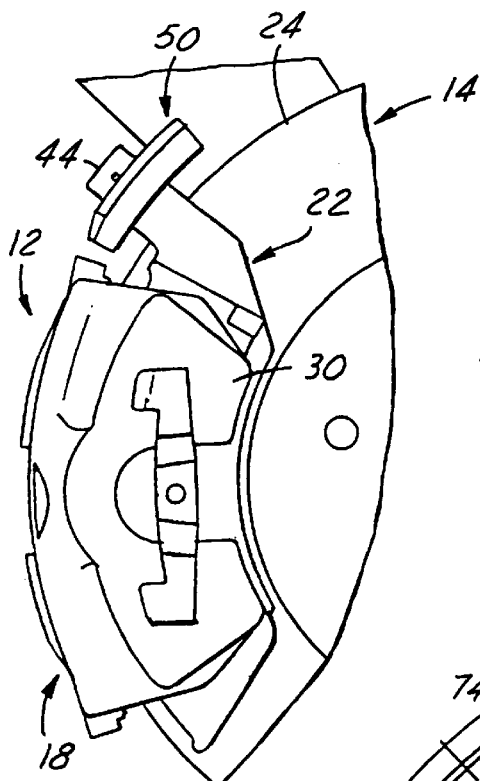
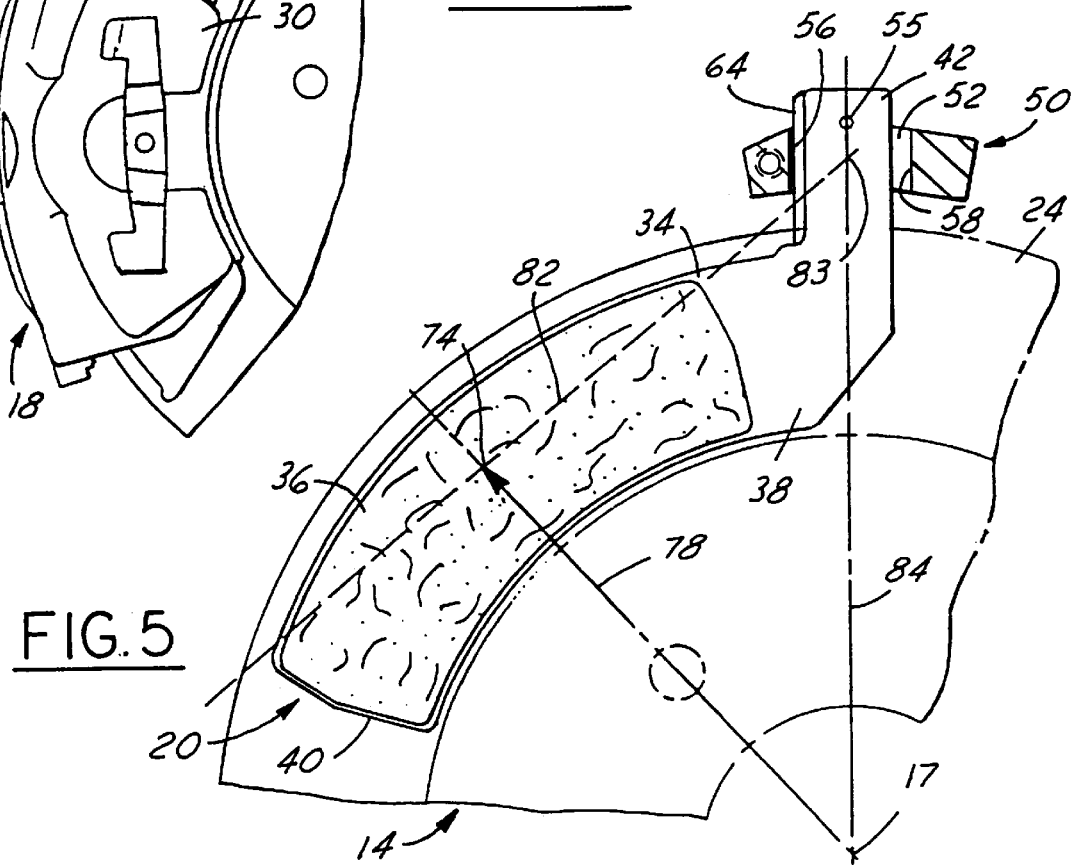
FIG. 4
FIG. 6
FIG. 5

TWIN RAMP BRAKE PAD REACTION MEMBER

FIELD OF INVENTION

This invention relates generally to braking systems and more particularly to a disc brake system having a unitary support for the brake pads.

BACKGROUND OF THE INVENTION

In a typical disc brake, a rotor secured to one of the wheels of an automotive vehicle rotates between a pair of brake pads. The braking load, when the brake pads engage the rotor, is reacted against abutments or rails at opposite ends of each pad. The pad ends push against one rail or the other depending on the direction of rotation. This produces a couple, forcing the leading edges of the brake pads together, giving rise to instability and noise.

SUMMARY OF THE INVENTION

In accordance with the present invention, each disc brake pad has one end portion connected to and partially restrained by a support, and a second free end portion which is cantilevered from the first end portion. The general operation of this type of braking arrangement is disclosed in co-pending application Ser. No. 08/931,605, filed Sep. 16, 1997 and which is assigned to the same assignee as that of the instant application and which is incorporated herein by reference.

More particularly, the disc brake assembly includes an axially rotatable brake rotor disposed between two brake pads. Each brake pad has a leading end portion and a trailing end portion. The leading end portions of the brake pads engage and are circumferentially restrained by a support. The trailing end portions are substantially cantilevered from the leading end portions. During forward braking, the pads pull rather than push against the support which provides a reaction abutment. A more stable and quieter braking action is the result.

Preferably, the support for the brake pads includes a rail in the form of a reaction block having a pair of slots or reaction surfaces, with the leading end portions of the brake pads having fingers respectively restrained within the slots. In normal forward wheel rotation, as soon as the brake is applied, the brake pads are pulled circumferentially by the friction forces which are reacted by the reaction block, effectively acting as a pinned joint at the interface between the reaction block and the fingers. The brake pads engage the rotor beyond this interface rather than before it. Therefore, the brake pads are dragged or pulled over the rotor rather than pushed, providing much less potential for vibration and noise. Both forward and reverse wheel rotation braking forces are reacted by the same reaction block. Since no trailing brake pad reaction block is required, unsprung mass is reduced. Less raw material is used, thereby lowering material costs. The associated vibrational propensities of a trailing brake pad restraint are eliminated. Brake pad cooling is improved because potential airflow is increased.

The undesirable reaction force couple present in prior constructions which forces the leading edges of the brake pads together is most effectively balanced or stabilized if the reaction surfaces of the slots engaged by the fingers of the brake pads are machined at an angle or in an arc rather than perpendicular to the brake pads. If machined at an angle, the reaction surface will provide a constant countering torque throughout the life of the brake pad. However, as the pad wears, the balancing effect diminishes. To more nearly balance out the changing couple as the pad wears, the reaction surface is machined in an arc. This provides a relatively large balancing couple when the pads are new, which dwindles as the pad wears thinner. By selecting the appropriate angle or arc, the reaction surface will produce as much counterbalancing as needed to produce a more stabile braking system with reduced vibration and propensity to squeal.

One object of this invention is to provide a disc brake assembly having the foregoing features and capabilities.

Another object of the invention is to provide a disc brake assembly which is more stable and quiet, is composed of a relatively few simple parts, is rugged and durable in use, and can be readily manufactured and assembled.

These and other objects, features and advantages of the invention will become more apparent as the following description proceeds, especially when considered with the accompanying drawings.

BRIEF DESCRIPTION OF THE DRAWINGS

FIG. 1 is a perspective view of an automobile equipped with a braking system constructed in accordance with the invention.

FIG. 2 is a fragmentary perspective view of the braking system.

FIG. 3 is an exploded, fragmentary perspective view of the braking system.

FIG. 4 is a fragmentary top view showing the brake pads on opposite sides of the rotor.

FIG. 5 is a view with parts in elevation and parts in section taken on the line 5—5 in FIG. 4.

FIG. 6 is a fragmentary side elevational view of the braking system taken in the direction of the arrow 6 in FIG. 2.

DETAILED DESCRIPTION OF THE PREFERRED EMBODIMENT

Figure 7:
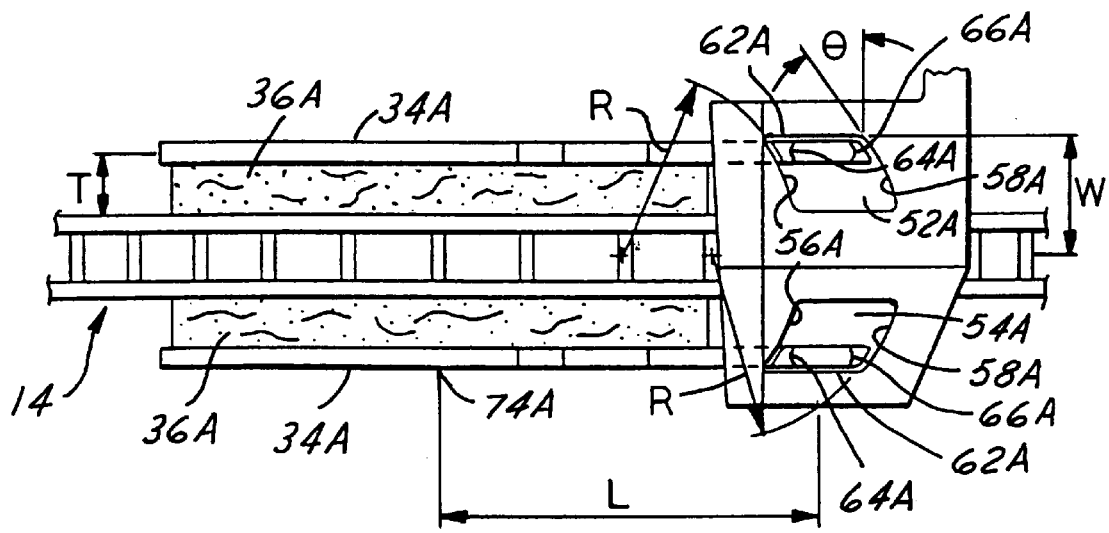
FIG. 7 is a view similar to FIG. 4, but shows a modification.

Referring now more particularly to the drawings, there is shown in FIG. 1 an automobile 10 having a disc brake 12 constructed in accordance with the invention. In FIGS. 2 and 3, the disc brake 12 is shown to include a circular rotor 14 concentric with and secured to a wheel 16 (FIG. 1) of the automobile 10 for axial rotation therewith about axis 17, and a generally U-shaped caliper 18 having brake pads 20 and 22 on opposite sides of the outer peripheral portion 24 of the rotor.

As further seen in FIGS. 2 and 3, a steering knuckle 26 provides a base or support for the caliper 18. The caliper 18 embraces the peripheral portion 24 of the rotor and has jaws 28 and 30 on opposite sides thereof to which one or more brake pads may be spring clipped. The jaw 28 is provided with a hydraulic cylinder 32 for urging the brake pad 20, which may be spring clipped to it, against one face of the peripheral portion 24 of the rotor and by reaction, the pad 22 against the opposite face of the peripheral portion of the rotor. This much of the disc brake is of conventional construction, as more fully described in U.S. Pat. No. 4,944,371 which is incorporated herein in its entirety by reference.

Each of the brake pads 20 and 22 includes an elongated, arcuate, flat, planar backing plate 34 (FIG. 5) which has planar, parallel, laterally inner and outer surfaces. Each backing plate is parallel to the rotor, and a body 36 of frictional material is provided on the laterally inner surface thereof facing the peripheral portion 24 of the rotor. The arcuate backing plates 34 are parallel to one another and each extends in a circular arc along the outer peripheral portion 24 of the rotor and is centered on the axis 17 of the rotor.

In FIGS. 4 and 5, each of the brake pads 20 and 22 is shown to include opposite end portions 38 and 40. When the wheel 16 and rotor 14 are rotating counterclockwise in FIG. 5 (the forward direction), the end portion 38 is the leading end portion and the end portion 40 is the trailing end portion. The leading end portion 38 of the brake pad 20 has a radially outwardly extending finger 42 which is a flat, integral, coplanar extension of the backing plate of the brake pad 20. The leading end portion 38 of the brake pad 22 has a radially outwardly extending finger 44 which is a flat, coplanar, integral extension of the backing plate of the brake pad 22. Line 84 is a radius from the center 17 of rotation of the rotor 14 drawn through the center of finger 42. Although fingers 42 and 44 are shown extending outwardly parallel to line 84, they may be angled forwardly so that they extend outwardly parallel to line 78 (which also passes through the rotor axis 17), or parallel to any line passing through axis 17 between lines 78 and 84. Proper choice of finger orientation per these guide lines allows further reduction of radial instability.

As seen in FIGS. 2 and 3, a support including a rail in the form of a reaction block 50 is rigidly secured as by bolts 51 to the steering knuckle 26. Reaction block 50 has two laterally spaced-apart slots 52 and 54. As seen in FIGS. 4 and 5, the fingers 42 and 44 of the brake pads 20 and 22 extend into the respective slots 52 and 54. Each finger may be pinned in its slot or retained therein by a transverse pin extending through a hole 55 in the finger and bearing on the outer surface of the reaction block 50. The end 56 of each slot provides a reaction surface which is straight and flat, and forms an inclined acute angle θ to a line perpendicular to the central plane of the rotor 14 (FIG. 4). The end 58 of each slot provides a reaction surface which is straight and flat, and parallel to the reaction surface 56 and forms the same inclined acute angle θ to a line perpendicular to the central plane of the rotor 14. The ends 56 and 58 of each slot also form an acute angle with the planar surfaces of the associated backing plate. The reaction surfaces 56 of the slots 42 and 44 together define an included angle of less than 180°. The reaction surfaces 58 of the slots define the same included angle. The fingers 42 and 44 engage the reaction surfaces 56 on forward braking, whereas they engage the reaction surfaces 58 on rearward braking. The sides 60 and 62 of each slot are parallel to the plane of the finger therein and to the rotor 14.

The backing plates 34, at the leading end portions 38 of the brake pads, extend circumferentially from the fingers 42 and 44 and generally perpendicularly from the slots into which the fingers extend.

The distance between the reaction surfaces 56 and 58 of each of the slots 52 and 54 is slightly greater than the distance between the end edges 64 and 66 of the finger therein. The end edges 64 and 66 are flat and parallel to one another and parallel to the reaction surfaces 56 and 58. Thus, the end edges 64 have a flush engagement with the reaction surfaces 56 on forward braking, and the end edges 66 have a flush engagement with the reaction surfaces 58 on rearward braking.

The distance between the sides 60 and 62 of the slots 52 and 54 is greater than the distance between the flat parallel sides of the finger therein by an amount sufficient to allow the brake pads to be moved laterally inwardly and outwardly into and out of frictional contact with the opposite sides of the outer peripheral portion 24 of the rotor.

The trailing end portions 40 of the brake pads are free floating, that is, they are not connected to a reaction block or to any other abutment, nor do they engage any abutment of any kind which would resist rotation. Thus, other than any clipped connection to the caliper jaws or hydraulic cylinder, the brake pads are cantilevered from their leading end portions 38 via loose connection to the reaction block 50.

The point 74 in FIG. 5 is the approximate midpoint circumferentially and radially of the brake pad 20 and represents the point through which all resolved rotor drag forces act circumferentially along line 82. The line 78 is a radius from the center 17 of rotation of the rotor 14 to the midpoint 74. The line 82 drawn through the midpoint 74 perpendicular to radius 78 passes through the slot 52 and intersects the radius 84 at 83 which is the center of the finger 42 in slot 52. The same relationships apply to the brake pad 22.

This geometric relationship allows the brake pads to radially self-align on the rotor, thereby reducing radial instability of the pads and thereby reducing brake vibration and noise. Since the point of contact between the fingers 42,44 and the reaction block 50 is on or near line 82 as is resultant point 74 through which all rotor drag forces may be resolved in a circumferential direction, there is little or no radial force tending to radially push or pull the brake pad. This promotes stability and reduces brake noise.

As noted above, the reaction surfaces 56 and 58 of each of the slots 52 and 54 are formed at an acute angle θ to lines perpendicular to the central plane of the rotor 14. The angle θ is an angle selected to provide a constant torque to counterbalance the destabilizing couple which tends to pull the leading ends of the brake pads into the rotor and produce squeal. The angle θ is preferably determined by the formula $$\theta = \text{TAN}^{-1}\left(\frac{T}{L}\right)$$

where T, as shown in FIG. 7, equals the thickness of the body 36 of friction material plus one-half the thickness of the backing plate 34, and L equals the distance between the midpoint 74 of the brake pad 20 or 22 and the intersection 83 of the radius 84 through the midpoint of the finger and the line 82 which is drawn perpendicular to the radius 78 through midpoint 74. The reaction surfaces of both slots are formed to the same angle.

When, during counterclockwise rotation of the wheel 16 in the forward direction as shown in FIG. 5, the brake is applied by actuation of the cylinder 32 to move the brake pads 20 and 22 laterally inwardly to cause the friction material 36 to make contact with the opposite sides of the peripheral portion 24 of the rotor, there is a reaction "pull" on the reaction block 50 through the flush engagement of the edges 64 of the fingers 42 and 44 with the reaction surfaces 56 of the slots 52 and 54. Since the trailing end portions 40 of the brake pads are free floating, virtually all braking forces are reacted through the leading end fingers such that there is no reaction push on the trailing end portions and virtually no resultant instability and squeal as in prior designs. The movement of the fingers along the inclined reaction surfaces 56 provides a constant countering torque opposing the forces pressing the leading edges of the pads together. Although the leading end fingers push against the reaction block during clockwise or rearward braking of the wheel, the trailing end portions are still not subjected to reaction forces as substantially all braking forces are reacted through the fingers during both forward and rearward braking of the wheel. On rearward braking, the edges 66 of the fingers have a flush engagement with the reaction surfaces 58 of the slots and in this case, the movement of the fingers along the inclined reaction surfaces 58 provides a constant countering torque opposing the forces pressing the trailing edges of the pads together.

Figure 8:
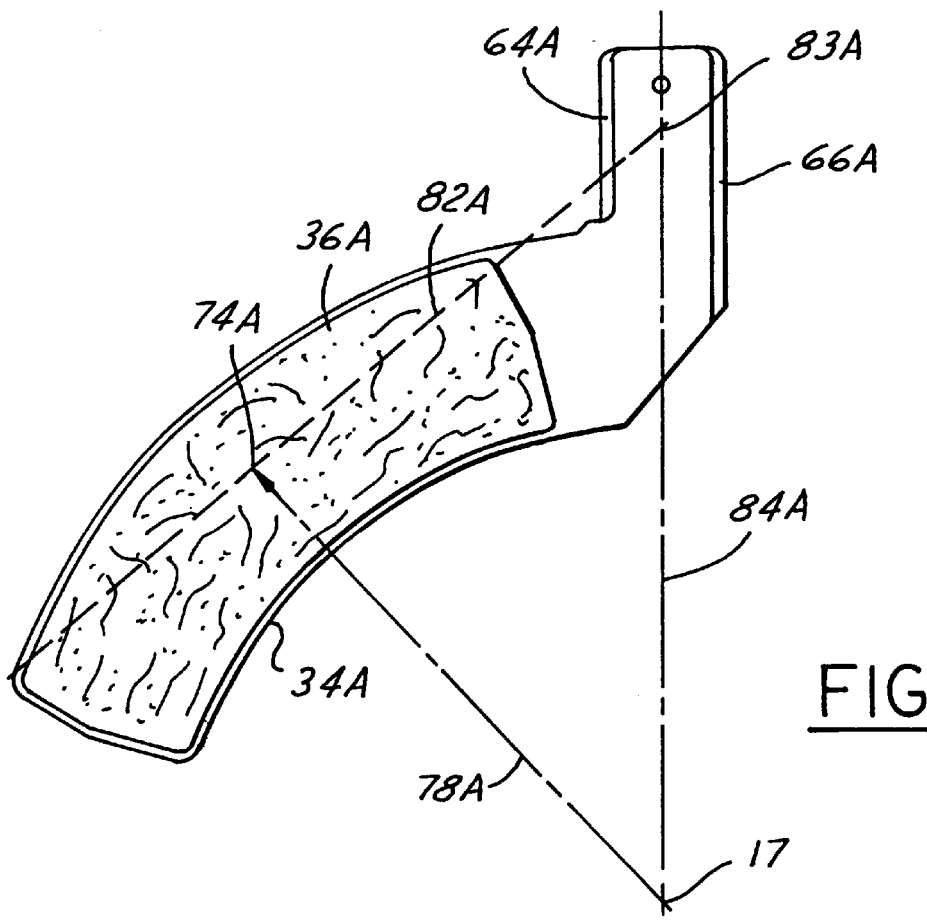
FIG. 8 is an elevational view of one of the brake pads in FIG. 7.

FIGS. 7 and 8, show a modification in which the reaction surfaces 56A and 58A of the slots 52A and 54A are arcuate rather than straight. Each arc is on a radius R having a center spaced toward the trailing end of the disc brake pad, that is, in the direction of forward rotation, on the central plane of the rotor 14. Preferably, the radius R is equal to W divided by cos (90–θ), where W equals the distance between the central plane of the rotor and the outer surface 62A of the slot, and θ is the angle whose tangent equals T/L where T equals the thickness of the body 36A of friction material plus one-half the thickness of the backing plate 34A, and L equals the distance between the midpoint 74A circumferentially and radially of the disc brake pad and the intersection 83A of a radius 84A from the axis of rotor rotation through the center of the finger and a line 82A through the midpoint 74A of the disc brake pad perpendicular to a second radius 78A from the axis of rotation through the midpoint 74A. Both reaction surfaces 56A and 58A of each slot have the same radius. Note in FIG. 7, the angle θ is formed by a tangent to the arc of the reaction surface 58A at its laterally outer extremity and a line perpendicular to the plane of the rotor.

Preferably, in this construction the two end edges 64A and 66A of the fingers which are engageable with the reaction surfaces of the slots are convexly rounded as indicated.

Other than is as described, the construction of FIGS. 7 and 8 is like the construction of FIGS. 1–6.

As the body 36A of friction material wears, the offset producing the original couples forcing the leading ends of the pads inwardly against the rotor diminishes. The arcuately formed reaction surfaces 56A and 58A more nearly match this changing couple than the straight line reaction surfaces 56 and 58 of the embodiment of FIGS. 1–6. This arcuate form of the reaction surfaces provides a larger angle (and hence larger balancing couples) when the pads are new, dwindling as the pads become thinner.

While preferably fingers with convexly rounded end edges are most effective when used with the arcuate reaction surfaces in FIGS. 7 and 8, fingers with this configuration may also be used with the first described embodiment in which the reaction surfaces are straight rather than arcuate. Likewise, the finger construction in the first embodiment may, if desired, also be used with the arcuate reaction surface type construction in the second embodiment.

What is claimed is:

1. A disc brake assembly comprising a rotor having an axis of rotation, first and second arcuate disc brake pads concentric with said rotor, each of said disc brake pads comprising an arcuate backing plate having a leading end portion and a trailing end portion and provided with an inner surface, a body of friction material on the inner surface of the backing plate of each of said disc brake pads, means for moving said disc brake pads laterally inwardly and parallel to said axis of rotation to cause the bodies of friction material to make friction contact with said rotor, means providing a generally radially extending reaction surface adjacent the leading end portion of the backing plate of each of said disc brake pads, and a generally radially extending finger on the leading end portion of the backing plate of each of said disc brake pads engagable with the associated reaction surface when the body of friction material thereof contacts said rotor as said rotor rotates in one direction to circumferentially restrain movement of said disc brake pads and said rotor in said one direction, said reaction surfaces extending laterally inwardly at an inclination relative to a line parallel to the axis of rotation of said rotor in a direction away from said one direction of rotor rotation.

2. The disc brake assembly of claim 1, wherein each of said reaction surfaces is flat.

3. The disc brake assembly of claim 2, wherein each of said fingers has a flat surface inclined at the same inclination as the associated reaction surface for flush engagement therewith.

4. The disc brake assembly of claim 1, wherein each of said reaction surfaces extends laterally inwardly at said inclination relative to a line parallel to the axis of rotation of said rotor in a direction in an arc on a radius having a center spaced therefrom in said one direction.

5. The disc brake assembly of claim 4, wherein each of said fingers has a convex surface engageable with the associated reaction surface.

6. A disc brake assembly comprising a rotor having an axis of rotation, first and second arcuate disc brake pads concentric with said rotor, each of said disc brake pads comprising an arcuate backing plate having a leading end portion and a trailing end portion and provided with an inner surface, a body of friction material on the inner surface of the backing plate of each of said disc brake pads, means for moving said disc brake pads laterally inwardly and parallel to said axis of rotation to cause the bodies of friction material to make friction contact with said rotor, means providing a reaction surface adjacent the leading end portion of the backing plate of each of said disc brake pads, and a finger on the leading end portion of the backing plate of each of said disc brake pads engagable with the associated reaction surface when the body of friction material thereof contacts said rotor as said rotor rotates in one direction to circumferentially restrain movement of said disc brake pads and said rotor in said one direction, said reaction surfaces extending laterally inwardly at an inclination away from said one direction of rotor rotation, wherein each of said reaction surfaces is flat and extends laterally inwardly in a straight line, and wherein for each of said disc brake pads and associated reaction surfaces:

the straight line inclination of said reaction surface forms with a line parallel to the axis of rotation of said rotor, an angle whose tangent is equal to T/L where T equals the thickness of said body of friction material plus one-half the thickness of said backing plate and L equals the distance between the midpoint circumferentially and radially of said disc brake pad and the intersection of a first radius from the axis of rotation through said finger and a line through said midpoint of said disc brake pad perpendicular to a second radius from the axis of rotation through said midpoint.

7. The disc brake assembly of claim 6, wherein each of said fingers has a flat surface inclined at the same inclination as the associated reaction surface for flush engagement therewith.

8. A disc brake assembly comprising a rotor having an axis of rotation, first and second arcuate disc brake pads concentric with said rotor, each of said disc brake pads comprising an arcuate backing plate having a leading end portion and a trailing end portion and provided with an inner surface, a body of friction material on the inner surface of the backing plate of each of said disc brake pads, means for moving said disc brake pads laterally inwardly and parallel to said axis of rotation to cause the bodies of friction material to make friction contact with said rotor, means providing a reaction surface adjacent the leading end portion of the backing plate of each of said disc brake pads, and a finger on the leading end portion of the backing plate of each of said disc brake pads engageable with the associated reaction surface when the body of friction material thereof contacts said rotor as said rotor rotates in one direction to circumferentially restrain movement of said disc brake pads and said rotor in said one direction, said reaction surfaces extending laterally inwardly at an inclination away from said one direction of rotor rotation, wherein each of said reaction surfaces extends laterally inwardly at said inclination in an arc on a radius having a center spaced therefrom in said one direction, and further including a reaction block having slots into which said respective fingers extend, said slots each having a laterally inner surface adjacent to a central plane of said rotor and a laterally outer surface more remote from said central plane, said slots each having a surface between said inner and outer surfaces thereof constituting said reaction surface, and wherein for each of said disc brake pads and associated reaction surfaces:

the arc of said reaction surface has a radius R equal to W/cos (90−θ), where W equals the distance between said central plane and said outer surface of said slot and θ is the angle whose tangent equals T/L where T equals the thickness of said body of friction material plus one-half the thickness of said backing plate and L equals the distance between the midpoint circumferentially and radially of said disc brake pad and the intersection of a first radius from the axis of rotation through said finger and a line through said midpoint of said disc brake pad perpendicular to a second radius from the axis of rotation through said midpoint.

9. The disc brake assembly of claim 8, wherein each of said fingers has a convex surface engageable with the associated reaction surface.

10. A brake pad reaction member for first and second disc brake pads engagable with opposite sides of an axially rotatable rotor, said brake pad reaction member having a first reaction surface for reacting braking forces from said first brake pad and a second reaction surface for reacting forces from said second brake pad, said first and second reaction surfaces converging toward each other relative to a line parallel to the axis of rotation of said rotor in a direction such that said reaction surfaces define an included angle of less than 180°.

11. The member of claim 10 wherein said first and second reaction surfaces are defined by a pair of slots.

12. A disc brake pad assembly, comprising a rigid backing plate having a planar outer surface, and a planar inner surface extending parallel to said planar outer surface, a rotor parallel to said backing plate and adjacent to the inner surface thereof, a pad of friction material provided on said planar inner surface and engagable with said rotor, and a reaction surface located between said planar surfaces and forming an acute angle with said parallel planar surfaces, said reaction surface being located externally of said brake pad assembly, said backing plate having an abutment surface extending at the same acute angle to said planar surfaces as said reaction surface, said abutment surface being engagable with said reaction surface.

13. The assembly of claim 12, wherein said reaction surface is flat.

14. The assembly of claim 12, wherein said reaction surface is convex.

* * * * *